United States Patent [19]

Papadopoulos et al.

[11] Patent Number: 6,128,384
[45] Date of Patent: *Oct. 3, 2000

[54] SELF CONFIGURING TELEPHONE HEADSET AMPLIFIER

[75] Inventors: Costas Papadopoulos; David J. Truesdell, both of Acton, Mass.

[73] Assignee: VXI Corporation, Rollinsford, N.H.

[ * ] Notice: This patent is subject to a terminal disclaimer.

[21] Appl. No.: 08/995,771

[22] Filed: Dec. 22, 1997

[51] Int. Cl.⁷ .................................................. H04M 9/00

[52] U.S. Cl. ........................... 379/413; 379/395; 379/387

[58] Field of Search ................................... 379/387, 395, 379/413

[56] References Cited

U.S. PATENT DOCUMENTS

| | | |
|---|---|---|
| 3,592,971 | 7/1971 | Cowpland ................................. 179/81 |
| 3,733,441 | 5/1973 | McCorkle et al. . |
| 3,781,492 | 12/1973 | Cragg et al. . |
| 3,786,200 | 1/1974 | Camenzind . |
| 4,086,624 | 4/1978 | Fraley . |
| 4,087,647 | 5/1978 | Embree et al. . |
| 4,131,770 | 12/1978 | Dick . |
| 4,306,119 | 12/1981 | Kutzavitch . |
| 4,395,590 | 7/1983 | Pierce et al. . |
| 4,420,657 | 12/1983 | Larkin . |
| 4,536,888 | 8/1985 | Wilson . |
| 4,653,088 | 3/1987 | Budd et al. . |
| 4,685,129 | 8/1987 | Gavrilovich . |
| 4,754,484 | 6/1988 | Larkin . |
| 4,777,645 | 10/1988 | Faith et al. . |
| 4,782,524 | 11/1988 | McQuinn et al. . |
| 4,803,719 | 2/1989 | Ulrich . |
| 4,819,263 | 4/1989 | Franklin . |
| 4,839,917 | 6/1989 | Oliver . |
| 4,876,712 | 10/1989 | Brint et al. . |
| 4,879,746 | 11/1989 | Young et al. . |
| 4,882,745 | 11/1989 | Silver . |
| 4,893,331 | 1/1990 | Horiuchi et al. . |
| 4,899,372 | 2/1990 | Wahi et al. . |
| 4,916,735 | 4/1990 | Iida et al. . |
| 4,917,504 | 4/1990 | Scott et al. . |
| 4,918,723 | 4/1990 | Snyder ................................. 379/395 |
| 4,918,726 | 4/1990 | Snyder . |
| 4,928,306 | 5/1990 | Biswas et al. . |
| 4,930,156 | 5/1990 | Norris . |
| 4,951,002 | 8/1990 | Hanon . |
| 4,961,220 | 10/1990 | Tentler et al. . |
| 4,975,949 | 12/1990 | Wimsatt et al. . |
| 5,032,819 | 7/1991 | Sakurangi et al. . |
| 5,036,536 | 7/1991 | Hanon et al. . |
| 5,058,155 | 10/1991 | Larsen . |
| 5,086,454 | 2/1992 | Hirzel . |
| 5,099,514 | 3/1992 | Acree . |
| 5,113,428 | 5/1992 | Fitzgerald . |
| 5,125,032 | 6/1992 | Meister et al. . |
| 5,128,982 | 7/1992 | Dugdale et al. . |
| 5,157,711 | 10/1992 | Shimanuki . |

(List continued on next page.)

*Primary Examiner*—Forester W. Isen
*Assistant Examiner*—Clark S. Cheney
*Attorney, Agent, or Firm*—Samuels, Gauthier & Stevens, LLP

[57] ABSTRACT

A telephone headset interface circuit is coupled to a telephone line to extract power for use by a headset amplifier and is particularly adapted for use with telephone handsets having dynamic or electret microphones. The telephone line connects a telephone to a service system, such as a Central Office, a PBX system, or a Key system. The interface circuit includes a power extraction circuit having a plurality of circuit portions, each one coupled to a corresponding one of the telephone line wires for providing a predetermined output voltage, so that substantially identical electrical impedance characteristics are introduced to each such wire. An amplifier is coupled to the telephone handset such that the predetermined constant output voltage is coupled to the amplifier to power the amplifier from the telephone line when the telephone includes an electronic microphone handset. An isolated rectifier circuit powers the amplifier when the telephone includes another handset other than an electronic microphone handset, such as a carbon microphone handset or a DC powered handset.

62 Claims, 8 Drawing Sheets

U.S. PATENT DOCUMENTS

| | | | |
|---|---|---|---|
| 5,185,789 | 2/1993 | Hanon et al. | |
| 5,220,597 | 6/1993 | Horiuchi | |
| 5,235,637 | 8/1993 | Kraz et al. | 379/387 |
| 5,239,579 | 8/1993 | Schuh | 379/395 |
| 5,544,243 | 8/1996 | Papadopoulos | 379/413 |
| 5,623,544 | 4/1997 | Papadopoulos | 379/413 |
| 5,729,603 | 3/1998 | Huddart et al. | 379/387 |
| 5,838,804 | 11/1998 | Holthaus et al. | 381/111 |
| 5,946,392 | 8/1999 | Tague | 379/395 |

SELF CONFIGURING TELEPHONE HEADSET AMPLIFIER

BACKGROUND OF THE INVENTION

Headsets are often used where the need arises for "hands free" telephone operation. In order to enable headset operation with existing, conventional telephones, an interface/amplifier apparatus is required. Such apparatus connects together the telephone, its headset and the handset and permits headset or handset selection with a transfer switch. DC power is needed for headset interface/amplifier apparatus operation.

There are various telephone instrument designs in existence. In terms of headset interface requirements they fall under one of four categories, based on handset type: carbon, dynamic, electret and DC powered "three wire". Carbon handsets, when off hook, pass typically 20–60 mA of direct current through the carbon microphone. Such current is well in excess of the few milliamperes needed for a headset amplifier, and such carbon telephone headset amplifiers are available today, for example the carbon telephone headset amplifier GSA 50 from VXI Corporation of Rollinsford, N.H.

Dynamic microphone handsets receive no power from the telephone instrument and are a clear example of why a headset amplifier intended for such telephones requires DC power. Electret mic handsets operate at approximately 200 $\mu A$ and low voltage. Again, a headset amplifier requires a separate DC power source because the current obtainable from the telephone is limited by a high value resistor, typically 2.2 k$\Omega$. DC powered "three wire" handsets, for instance R type handsets used with AT&T Merlin® telephones actually have four connections: +DC power, transmit, receive and ground. The original intended purpose of the DC power is to operate a transmit and receive amplifier embedded in the handset.

Universal telephone headset amplifiers have been available that accommodate the handset variations. They rely on batteries or AC power adaptors. These devices may have as many as 18 DIP switches that the user is required to configure for the respective telephone by referring to a chart or calling the manufacturer. Hello Direct model Pro Amplifier™ is an example of such a product. It will be appreciated that with $2^{18}$=262,144 DIP switch possibilities, great care and accurate information is required for proper amplifier configuration.

A solution that avoids such switches and operates without batteries is described in U.S. Pat. Nos. 5,623,544 and 5,544,243 and has been sold as model GSA 60 by VXI Corporation. This interface/amplifier circuit is only suitable for so called electronic telephones, i.e., instruments with electret or dynamic handsets. Since this product does not operate with carbon or R type handsets, it is inappropriate for a large share of the telephone headset market. Call centers are often equipped with carbon or AT&T Merlin® (and other R derivative) telephone stations.

The voice signal levels provided at the telephone connector for handset receive are comparable among the aforementioned four telephone handset types, typically 10 mv. Headset amplifiers operate with this input level and provide gain, a volume control function and acoustic limiting (also referred to as AGC) when driving the headset receiver or receivers.

The transmit signal presented at the telephone connector by the handset microphone may be at one of two levels: tens of millivolts with dynamic or electret handsets and hundreds of millivolts with carbon or R type handsets. The transmit impedance is similarly at one of two levels: hundreds of ohms for dynamic or electret and tens of ohms for carbon or R type.

SUMMARY OF THE INVENTION

Accordingly, the invention provides a headset interface/amplifier apparatus that operates correctly upon connection to the telephone, without batteries or external AC power and without configuration switches. The telephone can have any of the aforementioned four handset types, and be connected to any of the four common telephone service types: Central Office, Key Telephone System, PBX or PBX with AC.

When used with electronic telephones, the headset amplifier of the invention is powered by DC extracted from the telephone line without disturbing line impedance. Carbon or R handset telephones will provide DC power to the present apparatus at their handset connector by means of current steering circuitry in the transmit amplifier disclosed. The resulting transmit level will be appropriate to the type of handset as will output impedance, determined by other circuitry in the transmit amplifier. A separate stage is provided to detect an R type handset connection and will then also steer DC as needed for headset amplifier operation.

The invention provides a telephone interface for use with a telephone, the telephone having a first connector for connection to a telephone line presenting a DC voltage and a second connector adapted for connection to a telephone handset. The interface includes a power circuit adapted for coupling to the telephone line and operative to provide a predetermined constant output voltage in response to the DC voltage and only when said telephone draws loop current from said telephone line. An amplifier is coupled to the second connector, wherein the predetermined constant output voltage is coupled to the amplifier to power the amplifier from the telephone line when the telephone includes an electronic microphone handset. An isolated rectifier circuit powers the amplifier from the second connector when the telephone includes another handset other than an electronic microphone handset, such as a carbon microphone handset or a DC powered handset.

DETAILED DESCRIPTION OF THE ILLUSTRATED EMBODIMENTS

Figure 1:
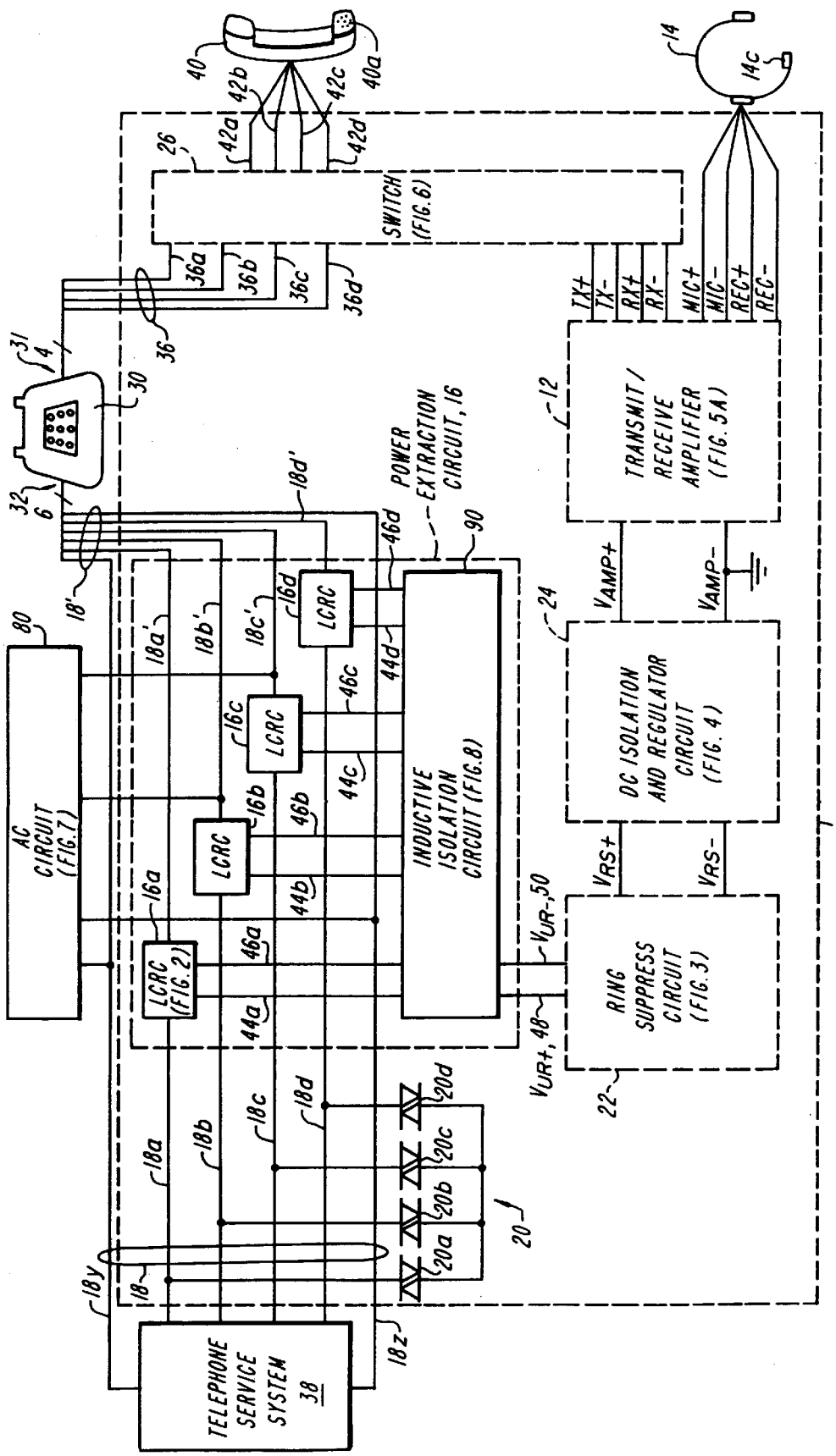
FIG. 1 is a block diagram of a telephone headset interface circuit in accordance with the invention.

Referring to FIG. 1, a telephone headset interface circuit 10 includes a transmit and receive amplifier 12, adapted for coupling to a headset 14, in order to adjust the amplitude of signals coupled between the headset 14 and telephone lines 18. The interface circuit 10 further includes a power extraction circuit 16 for extracting power from the telephone lines 18 to power the amplifier 12. Additionally, the telephone headset interface circuit 10 includes a voltage protection circuit 20, a ring suppress circuit 22, a DC isolation and regulator circuit 24, and a switch 26.

The interface circuit 10 is adapted for coupling to a handset 40, a headset 14, a telephone 30, and the telephone lines 18, including individual lines or wires 18a–18d, and 18y, 18z. Fuses (not shown) may be inserted in series with telephone lines 18 to facilitate compliance with FCC Part 68 testing requirements. A first connector or port 32 of the telephone 30, conventionally coupled directly to the telephone lines 18, is coupled to the telephone lines 18 through the power extraction circuit 16. A second connector 31 of the telephone 30 is coupled to the switch 26 via signal lines 36, including individual wires 36a–36d. Switch 26 will be described in greater detail below in conjunction with FIG. 6. Suffice it here to say however, that switch 26 permits selection of either headset 14 or handset 40 operation. Additionally, switch 26 provides for compatibility of the telephone headset interface circuit 10 with R type handsets of telephones 30.

The voltage protection circuit 20 includes a plurality of varistors 20a–20d for clamping the telephone line voltage in order to protect the interface circuit 10. More particularly, each of the varistors 20a–20d has a first terminal coupled to a corresponding one of telephone wires 18a–18d and a second terminal coupled to the second terminal of the other ones of varistors 20a–20d, as shown. With this arrangement, the voltage breakdown characteristic of each of varistors 20a–20d is one-half of the necessary "line to line" voltage breakdown. Stated differently, if varistors 20a–20d were coupled directly between any two of the wires 18a–18d, the equivalent voltage breakdown rating would be twice the value of the present arrangement. The characteristic breakdown voltage associated with varistors 20a–20d is selected to be low enough to protect the interface circuit 10, such as in the case of power surges, but high enough to prevent breakdown during ringing by a directly connected Central Office service system 38. A Central Office ringing voltage is typically a twenty Hertz, 200 volt peak to peak signal. When the voltage on any of telephone lines 18a–18d exceeds approximately 480 volts peak to peak, the corresponding one of varistors 20a–20d breaks down, clamping the voltage of the corresponding line 18a–18d to that of another corresponding line. The voltage of the varistors 20a–20d is selected so as not to affect the ringing voltage and to protect the interface circuit 10 without substantial overrating of components. In this way, excessive voltage is prevented from damaging the interface circuit 10 or the telephone 30.

Interface circuit 10 is coupled to a telephone service system 38 via telephone lines 18 and is adaptable for coupling to any one of a Central Office service system, an electronic Private Branch Exchange (PBX) service system, or an electronic Key service system. Telephone lines 18 connect to a telephone wall jack (not shown), for example in a subscriber's home. Power is extracted by circuit 16 from the telephone lines 18 for use by the headset amplifier 12, as will be described. Suffice it here to say that the desired extracted power to be supplied to the amplifier 12 is approximately 1.8 volts and approximately 2.0 milliamps.

Power extraction circuit 16 includes a plurality of power extraction circuits portions 16a–16d, referred to herein as a loop current rectifier circuits (LCR circuits), each coupled to a corresponding one of telephone wires 18a–18d, respectively. Specifically, each of LCR circuits 16a–16d is coupled between one of the telephone wires 18a–18d and a corresponding one of substantially identical telephone line wires 18a'–18d'. Telephone lines 18' are further coupled to the connector 32 of the telephone 30, as shown.

In order to accommodate the different telephone service systems 38 noted above, interface circuit 10 must be operable over a wide range of telephone line voltages and currents and must be compatible with telephone lines 18 having different wiring arrangements, as described below. Moreover, regardless of the type of service system 38 to which telephone 30 and interface circuit 10 are coupled, it is desirable that the circuit 10 be transparent to both the service system 38 and the telephone 30. To this end, minimal disturbance of the telephone line signals, including voice, data, and control signals, is desirable.

Central Office telephone lines carry approximately fifty volts DC nominally when the coupled telephone 30 is "on hook" and between approximately 6–8 volts when such telephone 30 is "off hook." Current from the Central Office flows through the telephone 30 when the telephone 30 is off hook (i.e., a DC current flow) and when the telephone 30 is ringing (i.e., an AC current flow), but not when the telephone 30 is on hook and not ringing. More particularly, the telephone 30 is rung by a 200 Vac "ringing" voltage provided by the Central Office. An additional factor that must be considered when coupling the power extraction circuit 16 to a Central Office telephone line is FCC compliance. Specifically, compliance with Tile 47 of the Code of Federal Regulations, Part 68 is required. The provisions of 47 CFR 68 govern, inter alia, parameters such as the maximum permissible load on the lines 18 when the telephone is ringing, when the telephone is off hook, or when the telephone is on hook.

With an electronic PBX telephone service system, the line voltage is typically around forty volts (i.e., thirty-six, forty, forty-eight) and only the value of line current may change from an on hook to an off hook condition. In an exemplary system, when the telephone 30 coupled to a PBX switch is on hook, the line current is approximately five milliamps; whereas, when the telephone 30 is off hook, the line current is approximately nine milliamps. In some PBX systems, the telephone 30 rings in response to a digital data signal transmitted over the lines 18.

In an electronic Key system, like a PBX, current may flow continuously on the telephone lines 18 and through the telephone 30. That is, current flows in both on hook and off hook conditions. A typical Key system has a continuous current of approximately thirty milliamps and a line voltage of approximately thirty-two volts associated therewith. Current in Key systems may flow wire to wire within a pair or from one pair to another pair.

In order to accommodate connections to any of the above described service systems 38 without prior knowledge, an LCR circuit 16a–16d is provided for coupling to each of the telephone wires 18a–18d. For example, Central Office and some PBX service systems have only one pair of active wires, such as wires, 18b, 18c associated therewith. In this case, providing an LCR circuit for coupling to each of such lines 18b, 18c requires only two LCR circuits 16b, 16c. On the other hand, in the case of electronic Key systems and some PBX systems, each of four wires 18a–18d is active. However, even in telephone systems where all four wires 18a–18d are used, such wires 18a–18d are not necessarily dedicated to the same use in all such systems. For example, in one type of Key system, wires 18*a* and 18*b* comprise a wire pair carrying voice information or signals and wires 18*c* and 18*d* comprise a wire pair carrying data signals. In an alternative type of Key system however, wires 18*b* and 18*c* comprise the wire pair carrying voice signals and wires 18*a* and 18*d* comprise the wire pair carrying data signals. Moreover, some Key systems (not shown) may include more than four wires 18*a*–18*d*. However, in the case where more than the four wires 18*a*–18*d* are used, providing four LCR circuits 16*a*–16*d* coupled to four corresponding wires 18*a*–18*d*, as shown, is sufficient. That is, the four LCR circuits 16*a*–16*d* extract the requisite power to drive the headset amplifier 12.

From the above, it is understood that the number of LCR circuits may be specifically tailored to a particular telephone service system. However, it is preferable that the interface circuit 10 be compatible with any such systems in order to simplify manufacture by providing a single interface circuit 10 accommodating any such system. To this end, an LCR circuit 16*a*–16*d* is associated with each of four wires 18*a*–18*d*, respectively, and use of the interface circuit 10 with service systems 38 having only two wires 18*b*, 18*c* or having six or more wires is in no way compromised. Thus, employing four LCR circuits 16*a*–16*d* for coupling to four wires 18*a*, 18*b* provides compatibility for use with various service systems 38 in which the number of active wires 18*a*–18*d* and the arrangement thereof differs. Compatibility of headset interface circuit 10 with any of the described service system types is achieved by coupling a separate power extracting LCR circuit 16*a*–16*d* to each of the telephone lines 18*a*–18*d*.

Another advantage of the present arrangement in which LCR circuits 16*a*–16*d* are coupled to corresponding telephone wires 18*a*–18*d* is that substantially identical electrical impedance characteristics are thereby introduced to each wire 18*a*–18*d*. More particularly, preferably both AC and DC impedance characteristics introduced to each of telephone wires 18*a*–18*d* are substantially identical. With this arrangement, disturbance of the telephone performance is minimized.

Due to the wiring variations that may be encountered, LCR circuits 16*a*–16*d* are "direction independent" so that the circuits 16*a*–16*d* operate in a like manner to extract power from the corresponding one of telephone lines 18*a*–18*d*, regardless of whether the circuit is connected to one of the lines 18*a*–18*d* by which information is transmitted from the service system 38 to the telephone 30 or from the telephone 30 to the service system 38.

The telephone headset interface circuit 10 of the invention also includes additional options such as an AC power line pair 18*y* and 18*z* supplied to the telephone 30, an AC circuit 80, and an inductive isolation circuit 90.

Certain types of telephone instruments, for example Northern Telecom M2616, are loop powered when connected in their most basic mode, but require external power when optional accessories are added. Options can include key strips for accessing additional extensions or data cards for interfacing with video terminals. In such cases, 30 VAC power is applied to the outermost two wires 18*y*, 18*z* of the common six wire telephone cord in addition to the 30 VDC loop power which is always available at the innermost pair.

Figure 2:
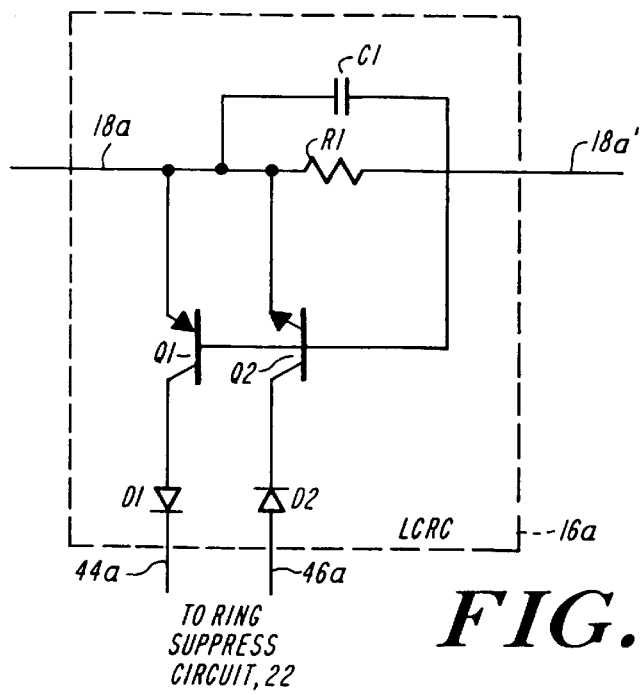
FIG. 2 is a schematic of an exemplary loop current rectifier circuit (LCR circuit) of FIG. 1.

The telephone instrument is designed such that when external AC power is present on the lines 18*y*, 18*z*, the DC loop current that would normally flow through the inner pair of conductors 18*b*, 18*c* is absent. The absence of loop current inhibits the power extraction by the LCR circuits 16 and therefore inhibits the headset amplifier operation. Furthermore, the absence of loop current disturbs telephone line impedance by adding a high series loss at each LCR circuit, since neither transistor Q1 nor Q2 of the LCR as shown in FIG. 2 is conducting. Both situations are corrected for by the AC circuit 80 which may be optionally added for operation with such telephones. The added circuit can be permanent, that is it can remain connected at all times in two, four or six wire telephone systems and causes no harm to the system when not needed. The AC circuit 80, and inductive isolation circuit 90 will be described in more detail with reference to FIGS. 7 and 8.

Referring now also to FIG. 2, the power extraction circuit 16 will be described in conjunction with exemplary LCR circuit 16*a*. LCR circuit 16*a* is serially coupled between corresponding telephone lines 18*a* and 18*a* ' as shown, and provides DC current on one of the two lines 44*a* or 46*a* depending on the direction of current in lines 18*a*, 18*a*'. In one embodiment, LCR circuit 16*a* advantageously includes a resistor R1 coupled in parallel with a capacitor C1 although it is understood that the circuit can be constructed without resistor R1.

In this embodiment, once enough current flows to cause a voltage drop of approximately 0.6 volts between the base and emitter of transistors Q1 and Q2, one of the transistors Q1, Q2 conducts. Note that the one of the transistors Q1, Q2 that conducts in response to a 0.6 volt drop depends on the direction of the current flow on telephone lines 18*a*, 18*a*'. For example, if current is flowing from the telephone system 38 to the telephone 30 sufficient to drop 0.6 volts across resistor R1, the base to emitter junction of PNP transistor Q1 is forward biased; whereas, when current is flowing from the telephone 30 to the telephone system 38 sufficient to drop 0.6 volts across resistor R1, it is the base to emitter junction of NPN transistor Q2 that is forward biased. In either case, once one of the transistors Q1, Q2 conducts, current is diverted from telephone lines 18*a*, 18*a*' to the inductive isolation circuit 90 via unregulated power lines 44*a*, 46*a*. Diodes D1, D2 are coupled in series with a respective one of transistors Q1, Q2, as shown, in order to provide isolation. More particularly, diodes D1, D2 prevent the base to collector junction of the one of transistors Q1, Q2 which is in a non-conducting state from conducting.

It is desirable that the power extraction circuit 16 be enabled (i.e., power diverted) when as little as approximately 0.5 milliamps flows through telephone lines 18 even though the lowest off hook line current is approximately nine milliamps (i.e., in the case of a PBX system). This is because the ring suppress circuit 22 is provided to sense the presence of a ringing voltage on lines 18 and such ringing voltage may have a current of approximately 1.0 milliamp associated therewith (i.e., in the case of a typical Central Office ringing voltage). Thus, in order to reliably detect such ringing voltage, the LCR circuits 16*a*–16*d* are enabled when as little as 0.5 milliamps is present on lines 18. To this end, resistor R1 is approximately 1.5 Kohms, so that one of transistors Q1, Q2 conducts when approximately 0.4 milliamps flows through telephone lines 18. Or stated differently, when approximately 0.4 milliamps of current flows, 0.6 volts is dropped across resistor R1, thereby forward biasing one of transistors Q1, Q2.

In order to achieve substantial "transparency" of the interface circuit 10 to both the telephone system 38 and the telephone 30, a minimum voltage drop is introduced between lines 18, 18', such as substantially less than 2.0 volts. The voltage drop across resistor R1 is equal to the $V_{BE}$ of the conducting one of transistors Q1, Q2, or approximately 0.6 volts. This relatively low voltage drop between telephone lines 18, 18' is desirable for several reasons. First, in the case where the telephone lines 18 are directly connected to a Central Office service system, the on hook voltage thereon is nominally between 6.0 and 8.0 volts. In this case, it is imperative that only a relatively low voltage drop be introduced between the lines 18 and 18' since otherwise, the performance of telephone 30 may be sacrificed. Additionally, even in the configuration of PBX or Key system coupled telephone lines 18 (i.e., where the off hook voltage is approximately forty and thirty-two volts, respectively), the system may nevertheless be sensitive to voltage drops. For example, such systems may initiate diagnostic routines in order to determine if the sensed voltage drop is indicative of a telephone system failure.

Capacitor C1 is disposed in parallel with resistor R1 to pass AC signals between telephone lines 18, 18' in order to avoid data signal degradation. More particularly, it has been found that in certain PBX service systems, data signals may be degraded by serial coupling through resistor R1 and base to emitter junctions of transistors Q1, Q2. With capacitor C1, such data signals are AC coupled across resistor R1 and thus, are not adversely affected. Capacitor C1 is approximately 33.0 microfarads.

Referring briefly back to FIG. 1, it is noted that each of the LCR circuits 16b–16d operates in a like manner to exemplary LCR circuit 16a described above. Thus, each of LCR circuits 16b–16d is coupled between corresponding telephone lines 18b, 18b'–18d, 18d', respectively, and provides unregulated power on power lines 44b, 46b- 44d, 46d. The unregulated power lines 44a, 46a- 44d, 46d of each of the LCR circuits 16a–16d are interconnected at the inductive isolation circuit 90 to provide a single, unregulated power line pair 48, 50 to the ring suppress circuit 22, as shown. The positive one 48 of the unregulated power line pair 48, 50 is labelled $V_{UR+}$ and the negative one 50 thereof is labelled $V_{UR-}$.

Figure 3:
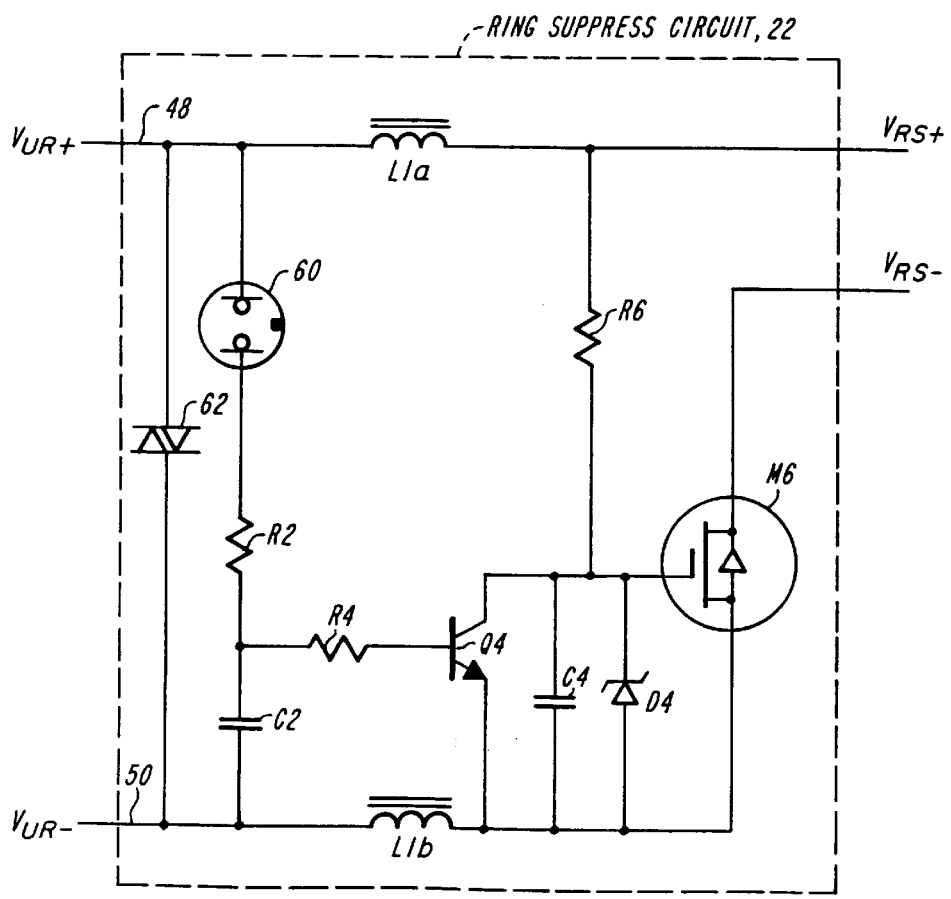
FIG. 3 is a schematic of the ring suppress circuit of FIG. 1.

Referring now to FIG. 3, the ring suppress circuit 22 receives unregulated voltage $V_{UR+}$, $V_{UR-}$ and provides ring suppressed voltage $V_{RS+}$, $V_{RS-}$. The purpose of the ring suppress circuit 22 is to ensure that when the telephone 30 is ringing (i.e. when a ringing voltage is present on telephone lines 18), the power extraction circuit 16 does not divert power to the transmit/receive amplifier 12. That is, upon detection of a ringing voltage, the ring suppress circuit 22 decouples the unregulated voltage $V_{UR+}$, $V_{UR-}$ from the DC isolation and regulator circuit 24 and thus, also from the amplifier 12, so that the transmit/receive amplifier 12 is prevented from loading the telephone lines 18. On the other hand, in both off hook operation and non-ringing, on hook operation with loop current present, the ring suppress circuit 22 simply passes the unregulated DC voltage $V_{UR+}$, $V_{UR-}$ therethrough to provide the ring suppressed voltage $V_{RS+}$, $V_{RS-}$. In this way, ringing is not detrimentally interfered with. That is, considering the use of the interface circuit 10 in the absence of the ring suppress circuit 22, upon detection of a current flow (albeit associated with a ringing voltage), the transmit/receive amplifier 12 would be powered, thereby diverting power from the lines 18 which may cause the telephone 30 to stop ringing prematurely. Put a different way, without the ring suppress circuit 22, it is possible that the ringing of the telephone 30 would cease even though the telephone 30 was not taken off hook.

Ring suppress circuit 22 includes a neon lamp 60, for sensing a ringing voltage on telephone lines 18 and decoupling the unregulated voltage $V_{UR+}$, $V_{UR-}$ from the DC isolation and regulator circuit 24 in response thereto. More particularly, once approximately 135 volts is impressed across lamp 60, the neon lamp 60 breaks down, effectively changing from an open circuit to a low impedance conducting state. With the neon lamp 60 conducting, the base to emitter junction of transistor Q4 is forward biased to a conducting state. The collector of transistor Q4 is coupled to the gate of FET M6 so that the conduction of transistor Q4 causes FET M6 to be turned off. With this arrangement, an open circuit is provided between $V_{RS+}$ and $V_{RS-}$, or in other words, $V_{UR+}$, $V_{UR-}$ is decoupled from the transmit/receive amplifier 12.

A varistor 62 is optionally coupled between $V_{UR+}$ and $V_{UR-}$ to provide additional protection to the circuit 22 in the case of an overvoltage condition. Varistor 62 will clamp the unregulated voltage lines 48, 50 to prevent the voltage differential between such lines from exceeding 480 volts peak to peak. It is recognized that varistors having a lower breakdown voltage may be employed while still complying with the FCC Part 68 maximum ringing voltage specification. A capacitor C2, here 0.01 microfarads, assures the conduction of transistor Q4 after the breakdown of the neon lamp 60 during the negative half-cycles of the ringing AC voltage.

Similarly, in this illustrative embodiment, capacitor C4 is coupled from the gate to the source of N channel FET M6 so that FET M6 is turned on slightly after the differential $V_{UR+}$, $V_{UR-}$ exceeds the gate threshold voltage of FET M6. Diode D4 is provided to protect the gate of FET M6. Capacitor C4 is a one microfarad capacitor and the delay provided thereby ensures that the neon lamp 60 has sufficient time to conduct in response to the characteristic breakdown voltage. A common mode choke L1, including windings L1a, L1b, is serially coupled between unregulated voltage lines 48, 50 and voltage lines $V_{RS+}$, $V_{RS-}$, as shown. In operation, choke L1 provides AC isolation between the telephone lines 18 and the circuit portions 24, 12, and 26. In this way, the performance of the telephone 30 is substantially unaffected by the interface circuit 10 since the AC load on the telephone lines 18 is minimized. That is, distortion of audio frequency signals and data transmitted over telephone lines 18 is minimized by the use of common mode choke L1. Common mode choke L1 in FIG. 3 is not mandatory, but may optionally be used if additional $V_{UR+}$ to $V_{UR-}$ isolation from telephone lines 18 is desired.

As mentioned above, FCC guidelines govern the suitable load on the telephone lines 18 during an on hook, non-ringing condition. The on hook load (i.e., maximum leakage) is required to be less than twenty microamps for voltages of one-hundred volts or less. This requirement is met in the present case by the neon lamp 60 which is effectively an open circuit drawing practically no current until the lamp enters the low impedance state. That is, when a ringing voltage is absent from the telephone line, the neon lamp draws negligible current, such as less than one microamp.

Figure 4:
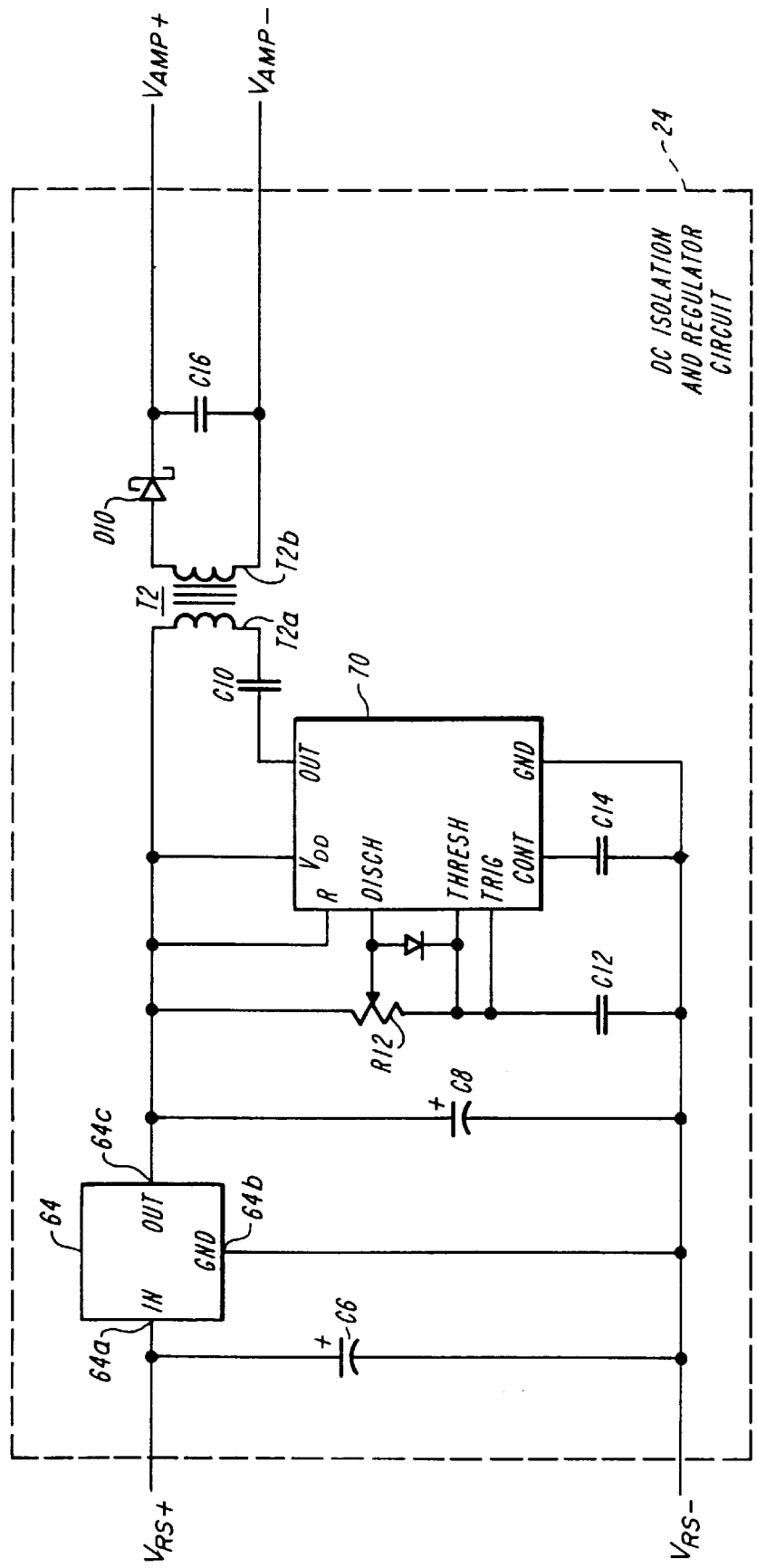
FIG. 4 is a schematic of the DC isolation and regulator circuit of FIG. 1.

Referring now to FIG. 4, the DC isolation and regulator circuit 24 will be described. The purpose of circuit 24 is to convert the ring suppressed voltage $V_{RS+}$, $V_{RS-}$ into regulated voltage $V_{AMP+}$, $V_{AMP-}$ for use by the amplifier 12. Additionally, circuit 24 provides DC isolation between the ring suppressed voltage $V_{RS+}$, $V_{RS-}$ and the regulated voltage $V_{AMP+}$, $V_{AMP-}$ in order to maintain proper telephone performance. The DC isolation is beneficial but not essential for operation with PBX and Central Office systems; it is necessary for Key systems. The sidetone of handset 40 or headset 14 refers to a portion of a transmitted voice signal that is coupled, or fed back to the receiver portion of the handset 40 or headset 14, respectively, so that the user can hear his own voice and adjust his speaking level accordingly. By preventing a DC path around the hybrid circuit of telephone 30, disturbance of both DC and AC characteristics of the telephone lines 18 is minimized. To this end, the circuit 24 includes a voltage regulator 64, such as an LM2936Z-5.0 three terminal fixed regulator IC. Capacitors C6 and C8, are provided for conventional operation in conjunction with the voltage regulator 64 and, in the illustrative circuit, have values of 1.0 microfarad, and 47.0 microfarads, respectively. Terminal 64*b* of the voltage regulator 64 is the common terminal, as shown. In the present arrangement, approximately 1.4 milliamps of current enters the input terminal 64*a* of the voltage regulator 64, in response to which a regulated 5.0 volt output is provided at the output terminal 64*c*.

Also provided is a transformer T2 having a primary winding T2*a* with a first terminal capacitively coupled to an output terminal of a timer or pulse generator 70 through a 0.47 microfarad capacitor C10 and a second terminal coupled to the output terminal 64*c* of regulator 64. The secondary winding T2*b* of transformer T2 has a first terminal coupled to the anode of a Schottky diode D10 and a second terminal coupled to a capacitor C16. The cathode of the diode D10 is coupled to capacitor C16 as shown and the voltage $V_{AMP+}$, $V_{AMP-}$ is provided across capacitor C16. The timer 70 is a TLC555CP IC with variable resistor R12 and capacitors C12, C14 arranged for a stable operation therewith. The frequency at which the timer 70 is operated is selected so as not to disturb audio performance. That is, if the timer frequency is too low, and approaches approximately 3.0 kilohertz, there may be audible interference in the telephone 30.

Additionally, it has been found that in some telephones, timer frequencies up to ten kilohertz can result in undesirable audible interference. Thus, it is preferable that the timer 70 be operated at a frequency of at least 15.0 kilohertz and, more preferably, at approximately 100 kilohertz. It is understood, however, that even higher timer frequencies can be employed. Using a transformer T2 having a 1:1 turns ratio, the duty cycle of the timer output signal is set at approximately 50% so as to provide an output voltage between $V_{AMP+}$, $V_{AMP-}$ of approximately 1.80 volts under load (i.e., when there is loop current on telephone lines 18 coupled to either a PBX, Key, or Central Office service system). While ordinarily it would be counter-indicated to provide a switching power supply (i.e., timer 70 in combination with transformer T2) following a linear regulator 64, in the present case, this arrangement provides benefits in the form of DC isolation and minimizing current draw, both of which are particularly desirable when interface 10 is used in conjunction with an electronic Key system. The DC isolation is provided to avoid unwanted data coupling and the minimization of current draw in turn, minimizes undesirable affects on transmit and receive performance and sidetone levels.

Figure 5A:
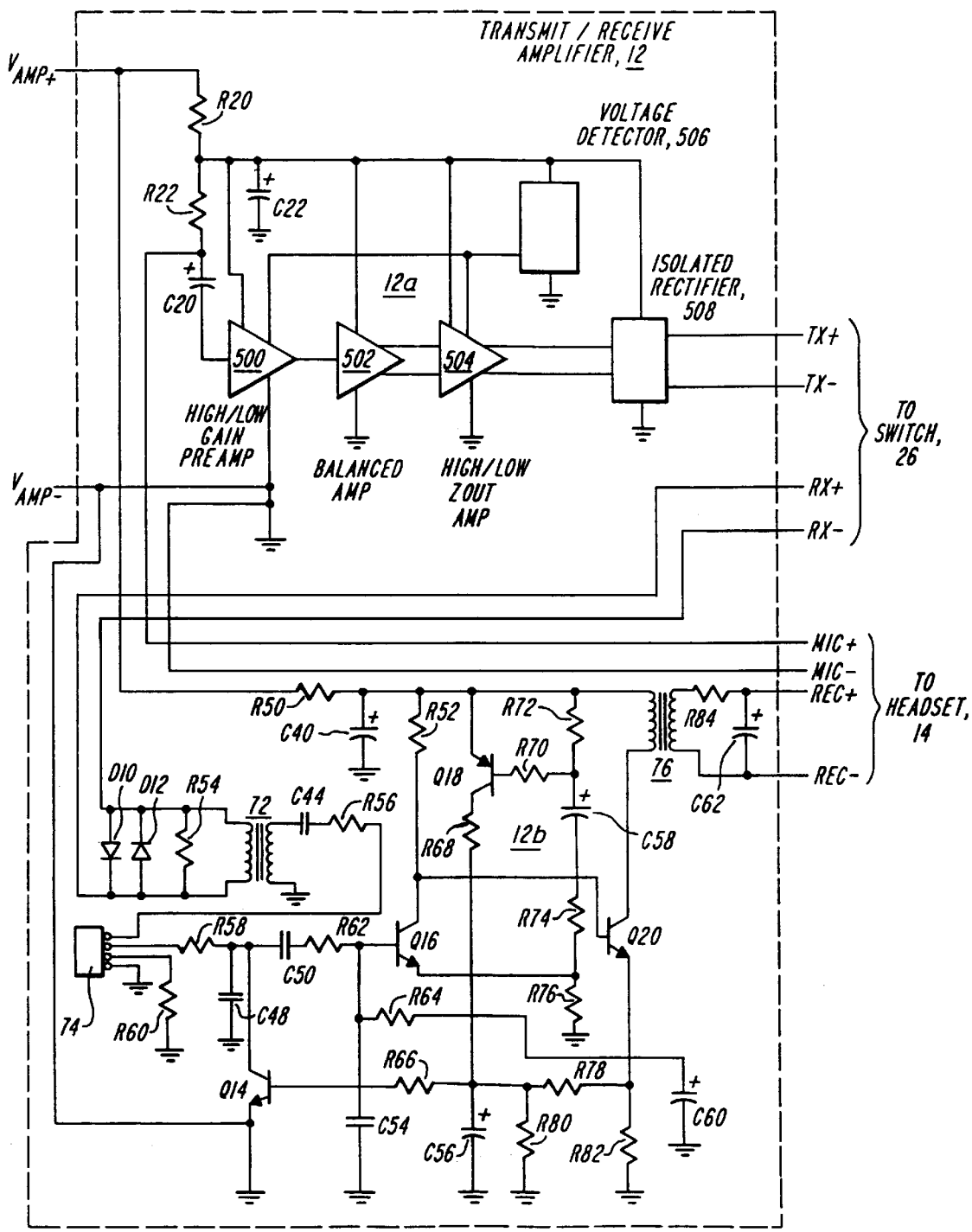
FIG. 5A is a schematic of the transmit/receive amplifier circuit of FIG. 1 with a block diagram of the transmit amplifier.
Figure 5B:
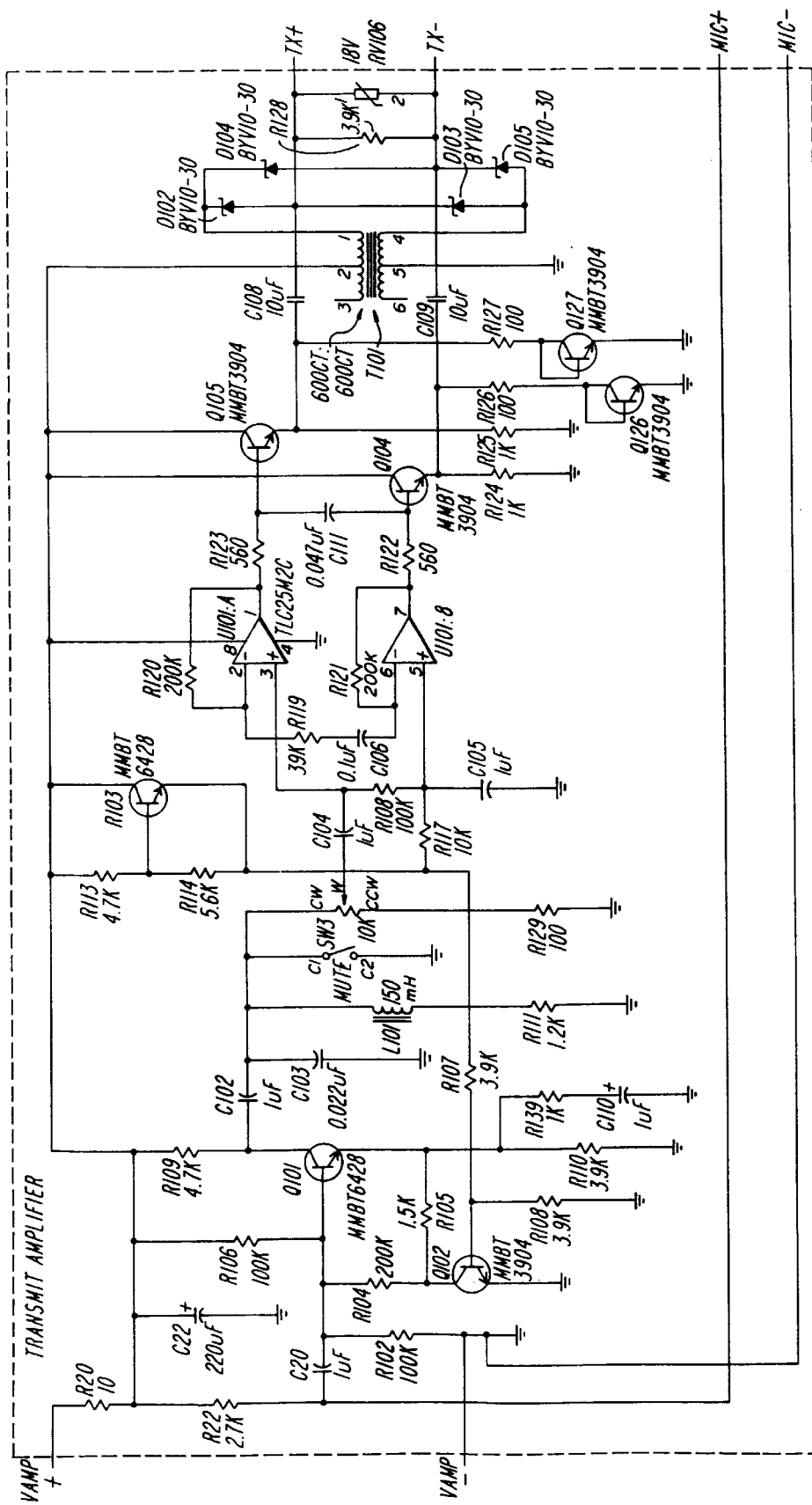
FIG. 5B is schematic of the transmit amplifier of FIG. 5A.

FIG. 5A is a schematic of the transmit/receive amplifier circuit of FIG. 1 with a block diagram of the transmit amplifier, and FIG. 5B is schematic of the transmit amplifier of FIG. 5A.

Referring to FIG. 5A, the transmit/receive amplifier 12 includes both a transmit amplifier 12*a* and a receive amplifier 12*b*. The transmit amplifier 12*a* includes a high/low gain preamplifier 500, a balanced amplifier 502, a high/low output impedance amplifier 504, a voltage detector 506 and an isolated rectifier 508. In operation, the transmit amplifier 12*a* couples information from the headset 14 to the telephone 30; whereas, the receive amplifier 12*b* couples information from the telephone 30 to the headset 14. The regulated power $V_{AMP+}$, $V_{AMP-}$ extracted from the telephone lines 18 as described above is coupled to the amplifier 12, as shown. The transmit amplifier 12*a* draws approximately 1.0 milliamp and the receive amplifier 12*b* also draws approximately 1.0 milliamp.

Considering first the transmit amplifier 12*a*, it is observed that such amplifier 12*a* is coupled between the TX+, TX− terminals of the switch 26 (FIG. 1) and the MIC+, MIC− terminals of the headset 14. More specifically, the MIC+, MIC− terminals of the headset 14 are coupled to the microphone 14*c* thereof. In operation, voice signals are coupled from the headset microphone 14*c* to the amplifier 12*a* at terminals MIC+, MIC− and are AC coupled across capacitor C20. Electret microphone 14*c* requires a bias voltage which is provided by resistors R20, R22.

In receive operation, when voice information is coupled from the telephone 30 to the headset 14, such information is processed by the receive amplifier 12*b*. Specifically, such voice information is passed from telephone 30, through switch 26 (FIG. 1) and to terminals RX+, RX− of the receive amplifier 12*b*. The voice signal thus processed is then coupled to the headset 14 through terminals REC+, REC−. Conventional receive amplifier 12*b* includes an automatic gain control (AGC) to regulate maximum acoustic receive levels at headset 14 and a volume control circuit 74 is provided for facilitating optimal volume control.

Figure 6:
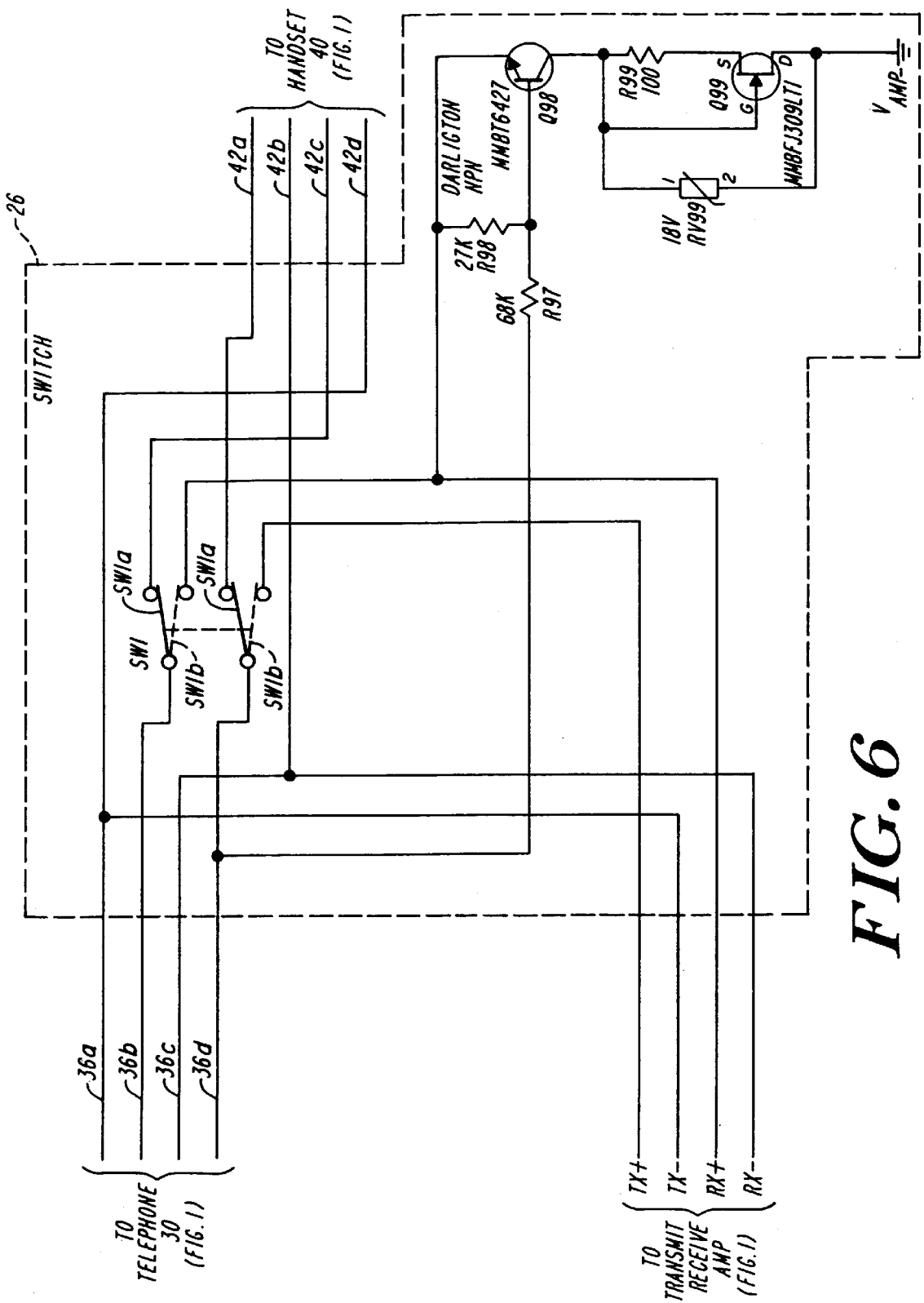
FIG. 6 is a schematic of the switch of FIG. 1.

Referring now to FIG. 6, the switch 26 is shown in greater detail. Switch 26 provides compatibility of the telephone headset interface circuit 10 with telephones 30 of various types.

Additionally, switch 26 permits selection between headset 14 and handset 40 operation. More particularly, switch 26 includes double pole, double throw transfer switch SW1 actuable to select either handset 40 or headset 14 operation. That is, when the transfer switch SW1 is in a first position labelled SW1*a* as shown, handset 40 operation is selected and telephone line wires 36*b*, 36*d* (FIG. 1) are coupled to wires 42*c*, 42*a*, respectively, of the handset 40. When transfer switch SW1 is in a second position labelled SW1*b* (shown by dotted lines), headset operation is selected and telephone line wires 36*b*, 36*d* are coupled to amplifier signal lines RX+, TX+, respectively.

The circuit comprising transistors Q98, Q99 and adjacent components acts as a detector for the presence of DC power in Merlin® R type handsets. In conventional handset wiring arrangements, the middle two wires 36*b*, 36*c* comprise a receive pair and the outer two wires 36*a*, 36*d*, a transmit pair. However, R wiring consists of a first transmit wire 36*a*, a second ground wire 36*b*, a third receive wire 36*c*, and a fourth positive DC power wire 36*d*.

When a DC voltage, typically 4 to 5 volts is present between 36*d* and 36*b*, Darlington NPN transistor Q98 is on and thus completes a current path between "Merlin ground" 36*b* and amplifier ground $V_{AMP-}$ This path is current limited to approximately 5 mA by JFET Q99 and source resistor R99. The complete path begins with positive current flowing from 36*d* in FIG. 6 to TX+ to D102, T101 pins 1 to 2, R20 and finally $V_{AMP+}$ in FIG. 5B, and returning to, 36*b* via Q99, Q98 as indicated.

It is advantageous to limit the current and prevent an overload in the DC power supply of the Merlin® telephone set. The handset voltage is sufficiently high to enable the high gain, low output impedance in the transmit amplifier as detailed hereinafter with reference to FIG. 5B, and as required by this AT&T telephone family. As with carbon telephones, DC power is obtained from the R type handset connector, therefore no through connection with the telephone line is needed for power extraction.

Examining the transmit amplifier 12a in greater detail, two types of operation will be described: a first electronic mode and a second carbon mode. Electronic telephones require that the headset amplifier extract DC power from the telephone service line. Referring again to FIG. 5A, in the electronic mode, the transmit amplifier 12a, the voltage detector 506 and the isolated rectifier 508 are inactive, the high/low gain preamp 500 is in the low gain condition, the high/low $Z_{OUT}$ amp 504 is in the high impedance condition, and all transmit and receive stages are operating at $V_{AMP+}$= 1.8 V.

Mic preamp transistor Q101 in FIG. 5B provides gain R109/R110=4.7K/3.9K=1.2 at low frequencies, rising to almost R109/(R110//R139)=4.7K/(3.9K//1K)=5.9 at higher frequencies. Additional frequency shaping as mandated in telephony practice is obtained from C103, L101, R111 such that the amplifier has a low corner frequency at 300 Hz, followed by flat gain to 1000 Hz, rising to a peak at 2500 Hz and then dropping steeply. A "mute", switch SW3 is at a zero DC node and disables the mic when desired by the operator in a manner which is "clickless" and therefore inaudible by the called party.

The balanced amp 502 consists of dual op amp U101:A, U101:B and adjacent RC components as shown in FIG. 5B. The op amp type is selected carefully for low voltage operation and low current drain, since the lowest possible power should be extracted from the telephone line. A suitable device is Texas Instruments TLC25M2C. A DC operating point of 0.8V for both op amp inputs is established by the voltage detector 506, corresponding to Q103, R113, R114, R107, R108 and Q102. The gain of each of two equal but opposite balanced amplifier branches is 200K/39K=5.1. The balanced high/low $Z_{OUT}$ amp 504 comprises Q104, R124 and Q105, R125. Since the 0.8 V DC operating point also appears at the bases of Q104 and Q105, the emitters are at approximately 0.2 V, so current is 200 µA per leg. The output impedance is approximately 26 mV/200 µA=130 Ω per side. The transmit signal is AC coupled by C108, C109 and emerges symmetrically at points TX+, TX−.

One of the benefits of such a balanced output is much greater signal voltage swing at a lower distortion level with a low voltage supply. A second benefit is the ability to deliver a transmit signal to at least one TX terminal, even if the other is at DC or AC ground as with R type handsets discussed with reference to FIG. 6. The balanced output impedance of approximately 260 Ω emulates dynamic handset microphones accurately, but also provides a proper signal to electret handset telephones of either bias voltage polarity and either of two bias resistor arrangements, a single resistor to the positive supply or one resistor in the positive leg and one in the negative. Resistor R128 acts as a "dummy load" electret current simulator to those telephones that periodically check their handset electret mic port to enable certain software features. A further function of R128 is to divide (reduce) any electret bias voltage from the telephone, for instance 5 V through a bias resistance of 10 KΩ and prevent diode bridge D102–D105 from conducting and therefore competing with $V_{AMP+}$.

In the second carbon mode, no connection to the telephone service line is required. It will be understood, however, that even when such a connection is inadvertently made, no detriment ensues and DC power is only obtained from the handset connector. Carbon telephone sets present typically 6.1 V of unknown DC polarity, current limited by 100 Ω at the transmit terminals of the handset connector 31 in FIG. 1. When such a voltage appears at TX+, TX−, the isolated rectifier 508, comprising Schottkey diode bridge D102–D105 and T101, conducts current regardless of DC polarity.

Transformer T101 is wired as a common mode choke. In other words, the inductive isolation it provides is beneficially increased by the opposing primary and secondary windings. The current path through T101 reaches the positive $V_{AMP+}$ and negative $V_{AMP-}$ amplifier rails at a voltage sufficiently high to turn on transistor Q102 and to develop a 1.8 V DC operating point for the op amps. Either one pair of diodes D102, D103 or the other pair D104, D105 is conducting. It is important to isolate this low impedance path from TX+, TX− to the supply rails and prevent an AC short or zero transmit gain, but it is also vital to incur a low DC loss in the process, in order to maximize supply voltage.

Such AC isolation and low DC loss is provided by the high reactance and low resistance of T101 windings. One half of each of the primary and secondary windings of a center tapped 600 Ω:600 Ω telephony transformer is sufficient. With Q102 on, the resulting Q101 preamp gain is R109/(R110//R105)=4.7K/(3.9K//1.5K)=5.1 at low frequencies and nearly R109/(R110//R105//R139)=4.7K/(3.9K//1.5K//1K)=9.0 at high frequencies.

When 1.8 V appears at the bases of Q104 and Q105, the emitter current is substantially increased because of diode connected transistors Q126, Q127 and 100 Ω resistors R126, R127. Each leg draws in excess of (1.8−0.6−0.6)/100=6 mA, has a low output impedance and a greater signal voltage swing suitable for the increased gain required to drive a carbon telephone. Total current is approx. 14 mA (since the remaining transmit and receive stages draw 1.0 mA each as before) and is sufficient to load the hybrid transformer and present a good termination to the telephone service line. Based on this 14 mA current, the supply rail voltage will now be derived.

The aforementioned 6.1 V is current limited by 100 Ω in the telephone and 80 Ω in T101 winding resistance and reduced by two Schottky diode drops of 0.2 V each, resulting in (6.1−0.2−0.2−14 mA)(100 Ω+80 Ω)=3.2 V. This voltage is appreciably higher than $V_{AMP+}$ =1.8 obtainable from the telephone service line and in turn can always reverse bias diode D10 of FIG. 4. Thus, if the headset amplifier in the instance of a carbon telephone is also connected to its telephone service line, no use is made of power extractable from the line except for regulator 64 and timer 70 idle current.

It will be appreciated that the headset amplifier is operable whether the DC supply is obtained from the telephone line for electronic telephones or from the handset connector for carbon or R type, with no switches or other adjustments to the headset interface/amplifier. Transmit gain and impedance level have been shown to be correct for each of the following handset instances; electret mic, dynamic, R type and carbon.

Figure 7:
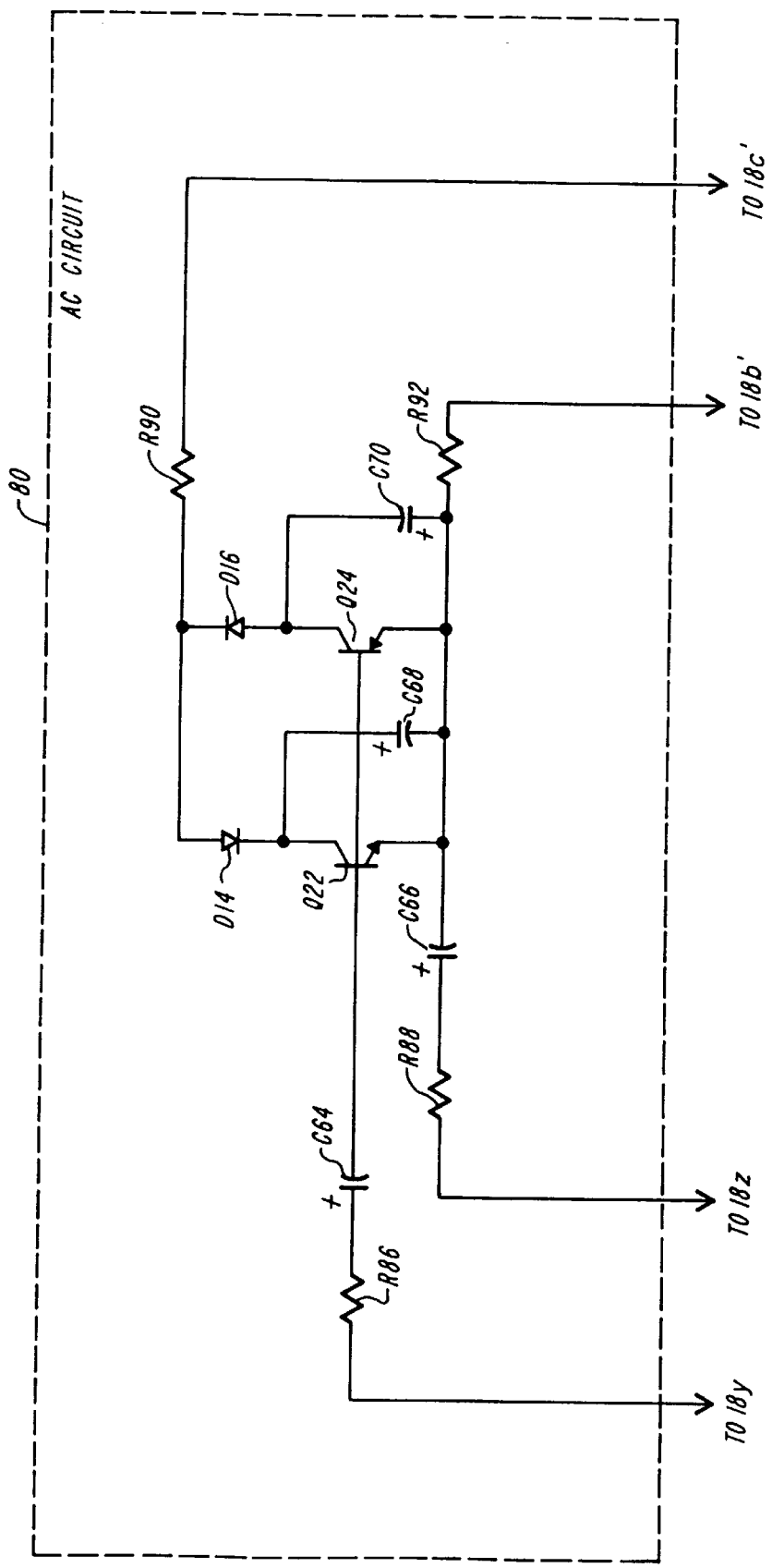
FIG. 7 is a schematic of an exemplary power compensation circuit in accordance with the invention.

With reference to FIG. 7, an exemplary embodiment of the AC circuit 80 in accordance with the present invention is shown. In operation, when external AC power is present on the pair 18y, 18z, it causes AC current to flow through resistor R86 and capacitor C64 to the parallel combination of base-emitter junctions of transistors Q22 and Q24 to capacitor C66 and resistor R88. When the AC wave form is positive, the base-emitter junction of NPN transistor Q22 is conducting. When negative, the base-emitter junction of PNP transistor Q24 is conducting. It will be appreciated that 30 volts DC for loop power is normally present on lines 18b, 18c, however, the polarity of the voltage is unknown. If line 18c is positive, the transistor Q22 will turn on and sink current through the path which includes resistor R90, diode D14, the collector-emitter of transistor Q22, and resistor R92 when the AC waveform is positive. Transistor Q22 will thus discharge capacitor C68.

When the AC waveform turns negative, transistor Q24 turns on and Q22 turns off, but diode D16 is still reverse biased and blocks any DC current to transistor Q24 or capacitor C70, however, current continues to flow through diode D14 to charge capacitor C68. If line 18b is positive, the same process takes place with diode D16, transistor Q24 and capacitor C70, but current flows in the opposite direction.

When the values for resistors R90 and R92, as well as capacitors C68 and C70 are chosen properly, for example 18 k ohms and 4.7 $\mu$F, approximately 0.8 mA DC current will be shunted across telephone line pair 18b' and 18c' with negligible ripple and therefore no audible AC hum. This current is low but sufficient to turn on the respective transistors in LCR circuits 16b, 16c, thus extracting power for the headset amplifier, and also avoiding the high series impedance to the telephone.

In the absence of AC power, the base-emitter junctions of transistors Q22 and Q24 are not conducting, therefore the circuit reaches a quiescent state with either capacitor C68 or C70 charged up to line voltage with no shunt current from lines 18b' to 18c'. In fact, FCC Part 68 specifies maximum DC leakage at 20 $\mu$A, thus compliance is maintained with or without circuitry for AC operation.

Certain PBX and most Key systems require a four wire connection to the telephone instrument. The inner pair typically carries voice and the outer pair carries data. The telephone is "phantom powered" by the system which applies one DC power polarity to one pair and the opposite polarity to the other pair.

When the telephone headset interface circuit 10 in accordance with the present invention is connected to such a telephone, all four LCR circuits 16 as shown in FIG. 1 are conducting. Lines 18a and 18d conduct DC current in one direction, and lines 18b and 18c conduct in the opposite direction. Undesirable shunt loading of the voice pair would possibly occur, if for example lines 44b and 44c were tied together at line 48 since they originate from LCR circuits with like polarity transistors and diodes conducting. Such loading can disturb line impedance and sidetone performance. Similar loading to the data pair would possibly occur if corresponding lines 46a and 46d were tied together at line 50, resulting in data errors.

It is desirable to prevent such shunt loading in the power extraction process and to present nearly an open circuit to the voice and data pairs. This isolation can be realized if each of the lines 44a–44d and 46a–46d carried a high value series inductor before being tied together at lines 48 and 50, respectively. Eight such inductors at 150 mH each can be connected to provide such isolation. Preferably, a small inexpensive transformer (for example 600 ohm center tapped to 600 ohm center tapped) can be connected to function as four inductors with a common tie point.

Figure 8:
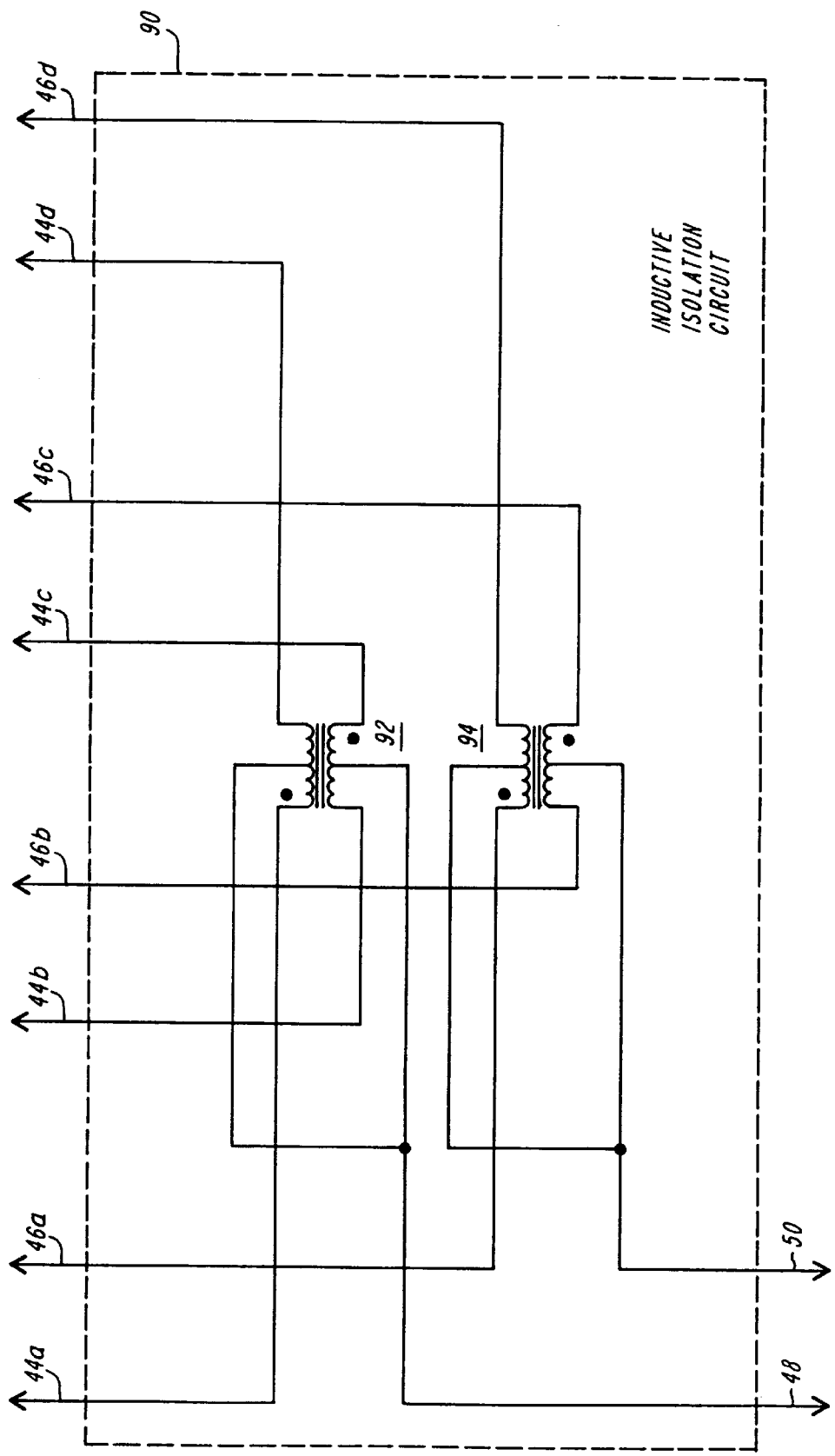
FIG. 8 is a schematic of an exemplary isolation circuit in accordance with the invention.

With reference to FIG. 8, when like current polarities are applied to opposite ends of any transformer winding with respect to its center tap, cancellation occurs and the resulting high impedance benefit is much greater than from equal value but separate inductors. In the embodiment illustrated, two such transformers are utilized, transformer 92 to isolate each of the four positive lines 44a–44d, and transformer 94 for the four negative lines 46a–46d. It will be appreciated that operation in two wire telephone systems is not affected by the unused windings.

It is also understood that two-line Central Office telephones where "Line 1" appears at 18b,18c and "Line 2" at 18a,18d of FIG. 1 are operable with the apparatus of the invention. The inductive isolation afforded by the transformer windings in FIG. 8 avoids adverse loading of either telephone line and cross-coupling of signals from one line to the other. Power extraction occurs transparently when either one or the other or both lines are off-hook.

Having described the preferred embodiment of the invention, it will be apparent to one of skill in the art that other embodiments incorporating their concepts may be used. Accordingly, the invention should be limited only by the spirit and scope of the appended claims.

What is claimed is:

1. A telephone interface for use with a telephone, said telephone having a first connector for connection to a telephone line presenting voice signals superposed on a DC voltage and a second connector adapted for connection to a telephone handset, said interface comprising:

a power circuit adapted for coupling to said telephone line and operative to immediately provide a predetermined constant output voltage in response to any telephone line voltage within the range of 5.0 to 50.0 volts DC only when said telephone draws loop current from said telephone line; and an amplifier coupled to said second connector, wherein said predetermined constant output voltage is coupled to said amplifier to power said amplifier from said telephone line when said telephone includes an electronic microphone handset;

an isolated rectifier circuit which powers said amplifier from said second connector when said telephone includes a handset other than an electronic microphone handset; and circuitry which automatically sets gain and impedance of said amplifier in response to detection of DC voltages at said second connector.

2. The telephone interface of claim 1, wherein said handset comprises a carbon microphone handset.

3. The telephone interface of claim 1, wherein said handset comprises a DC powered handset.

4. The telephone interface of claim 2 or 3 further comprising a voltage detector circuit.

5. The telephone interface of claim 4, wherein said voltage detector circuit enables lower transmit gain and higher transmit output impedance when connected to a telephone including an electronic microphone.

6. The telephone interface of claim 4, wherein said voltage detector circuit enables higher transmit gain and lower transmit output impedance when connected to a telephone including a carbon microphone.

7. The telephone interface of claim 1, wherein said amplifier comprises a balanced amplifier.

8. The telephone interface of claim 4, wherein said voltage detector circuit recognizes said DC powered handset and enables a current path for powering said amplifier from said second connector.

9. The telephone interface of claim 8, wherein said voltage detector circuit enables higher transmit gain and lower transmit output impedance when connected to a telephone including a DC powered handset.

10. A telephone interface for use with a telephone, said telephone having a first connector for connection to a telephone line presenting voice signals superposed on a DC voltage and a second connector adapted for connection to a telephone handset, wherein said telephone line includes a first wire and a second wire, said telephone interface comprising:

a power circuit, having a first power extraction circuit portion coupled to said first wire and a second power extraction circuit portion coupled to said second wire, for immediately providing a predetermined constant output voltage in response to said DC voltage and only when said telephone draws loop current from said telephone line, wherein each of said first and second power extraction circuit portions introduces substantially the same electrical impedance characteristics to each of said first and second wires, respectively;

an amplifier coupled to said second connector, wherein said predetermined constant output voltage is coupled to said amplifier to power said amplifier from said telephone line when said telephone includes an electronic microphone handset;

an isolated rectifier circuit which powers said amplifier from said second connector when said telephone includes a handset other than an electronic microphone handset; and circuitry which automatically sets gain and impedance of said amplifier in response to detection of DC voltages at said second connector.

11. The telephone interface of claim 10, wherein said handset comprises a carbon microphone handset.

12. The telephone interface of claim 10, wherein said handset comprises a DC powered handset.

13. The telephone interface of claim 11 or 12 further comprising a voltage detector circuit.

14. The telephone interface of claim 13, wherein said voltage detector circuit enables lower transmit gain and higher transmit output impedance when connected to a telephone including an electronic microphone.

15. The telephone interface of claim 13, wherein said voltage detector circuit enables higher transmit gain and lower transmit output impedance when connected to a telephone including a carbon microphone.

16. The telephone interface of claim 10, wherein said amplifier comprises a balanced amplifier.

17. The telephone interface of claim 13, wherein said voltage detector circuit recognizes said DC powered handset and enables a current path for powering said amplifier from said second connector.

18. The telephone interface of claim 17, wherein said voltage detector circuit enables higher transmit gain and lower transmit output impedance when connected to a telephone including a DC powered handset.

19. A telephone interface for use with a telephone, said telephone having a first connector for connection to a telephone line presenting voice signals superposed on a DC voltage and a second connector adapted for connection to a telephone handset, said telephone interface comprising:

a power circuit, coupled to said telephone line and operative to immediately provide a predetermined constant output voltage in response to said DC voltage and only when said telephone draws loop current from said telephone line, said power circuit dropping a voltage of less than 2.0 volts;

an amplifier coupled to said second connector, wherein said predetermined constant output voltage is coupled to said amplifier to power said amplifier from said telephone line when said telephone includes an electronic microphone handset;

an isolated rectifier circuit which powers said amplifier from said second connector when said telephone includes a handset other than an electronic microphone handset; and circuitry which automatically sets gain and impedance of said amplifier in response to detection of DC voltages at said second connector.

20. The telephone interface of claim 19, wherein said handset comprises a carbon microphone handset.

21. The telephone interface of claim 19, wherein said handset comprises a DC powered handset.

22. The telephone interface of claim 20 or 21 further comprising a voltage detector circuit.

23. The telephone interface of claim 22, wherein said voltage detector circuit enables lower transmit gain and higher transmit output impedance when connected to a telephone including an electronic microphone.

24. The telephone interface of claim 22, wherein said voltage detector circuit enables higher transmit gain and lower transmit output impedance when connected to a telephone including a carbon microphone.

25. The telephone interface of claim 19, wherein said amplifier comprises a balanced amplifier.

26. The telephone interface of claim 22, wherein said voltage detector circuit recognizes said DC powered handset and enables a current path for powering said amplifier from said second connector.

27. The telephone interface of claim 26, wherein said voltage detector circuit enables higher transmit gain and lower transmit output impedance when connected to a telephone including a DC powered handset.

28. A telephone interface for use with a telephone, said telephone having a first connector for connection to a telephone line presenting voice signals superposed on a DC voltage, wherein said telephone is adapted for ringing in response to a ringing voltage provided on the telephone line, and a second connector adapted for connection to a telephone handset, said telephone interface comprising:

a power circuit, coupled to said telephone line, operative to immediately provide a predetermined constant output voltage in response to said DC voltage only when said telephone draws loop current from said telephone line;

an amplifier coupled to said second connector, wherein said predetermined constant output voltage is coupled to said amplifier to power said amplifier from said telephone line when said telephone includes an electronic microphone handset;

an isolated rectifier circuit which powers said amplifier from said second connector when said telephone includes a handset other than an electronic microphone handset;

a ring suppress circuit, serially coupled to said power circuit and said amplifier, for sensing said ringing voltage on said telephone line and decoupling said power circuit from said amplifier in response thereto, wherein said ring suppress circuit draws less than one microamp when said ringing voltage is absent from said telephone line; and circuitry which automatically sets gain and impedance of said amplifier in response to detection of DC voltages at said second connector.

29. The telephone interface of claim 28, wherein said handset comprises a carbon microphone handset.

30. The telephone interface of claim 28, wherein said handset comprises a DC powered handset.

31. The telephone interface of claim 29 or 30 further comprising a voltage detector circuit.

32. The telephone interface of claim 31, wherein said voltage detector circuit enables lower transmit gain and higher transmit output impedance when connected to a telephone including an electronic microphone.

33. The telephone interface of claim 31, wherein said voltage detector circuit enables higher transmit gain and lower transmit output impedance when connected to a telephone including a carbon microphone.

34. The telephone interface of claim 28, wherein said amplifier comprises a balanced amplifier.

35. The telephone interface of claim 31, wherein said voltage detector circuit recognizes said DC powered handset and enables a current path for powering said amplifier from said second connector.

36. The telephone interface of claim 35, wherein said voltage detector circuit enables higher transmit gain and lower transmit output impedance when connected to a telephone including a DC powered handset.

37. A telephone interface for use with a telephone, said telephone having a first connector for connection to a telephone line and a second connector for connection to a telephone voice accessory, wherein said telephone line includes at least a first and second pair of wires, and wherein said first pair of wires presents voice signals superposed on a DC voltage, said telephone interface comprising:

a power extraction circuit coupled to said first pair of wires for immediately providing a predetermined output voltage in response to a specified DC voltage provided on said first pair of wires and in the absence of AC voltage on said second pair of wires;

a power compensation circuit coupled to both said first and second pairs of wires for controlling said power extraction circuit to provide said predetermined output voltage in response to the presence of AC voltage on said second pair of wires, wherein said power compensation circuit controls said power extraction circuit to maintain substantially the same electrical impedance characteristics to said first pair of wires regardless of the presence or absence of AC voltage on said second pair of wires;

an amplifier coupled to said second connector and to said power extraction circuit, said amplifier being powered by said output voltage from said telephone line when said telephone includes an electronic microphone handset;

an isolated rectifier circuit which powers said amplifier from said second connector when said telephone includes a handset other than an electronic microphone handset; and circuitry which automatically sets gain and impedance of said amplifier in response to detection of DC voltages at said second connector.

38. The telephone interface of claim 37, wherein said handset comprises a carbon microphone handset.

39. The telephone interface of claim 37, wherein said handset comprises a DC powered handset.

40. The telephone interface of claim 38 or 39 further comprising a voltage detector circuit.

41. The telephone interface of claim 40, wherein said voltage detector circuit enables lower transmit gain and higher transmit output impedance when connected to a telephone including an electronic microphone.

42. The telephone interface of claim 40, wherein said voltage detector circuit enables higher transmit gain and lower transmit output impedance when connected to a telephone including a carbon microphone.

43. The telephone interface of claim 37, wherein said amplifier comprises a balanced amplifier.

44. The telephone interface of claim 40, wherein said voltage detector circuit recognizes said DC powered handset and enables a current path for powering said amplifier from said second connector.

45. The telephone interface of claim 44, wherein said voltage detector circuit enables higher transmit gain and lower transmit output impedance when connected to a telephone including a DC powered handset.

46. A telephone interface for use with a telephone, said telephone having a first connector for connection to a telephone line and a second connector for connection to a telephone voice accessory, wherein said telephone line includes at least a first and second pair of wires, said telephone interface comprising:

a power extraction circuit coupled to said first and second pairs of wires and having first and second output terminal sets for immediately providing portions of a predetermined output voltage of one polarity on said first output terminal set and of the opposite polarity on said second output terminal set;

an isolation circuit coupled to both said first and second output terminal sets for preventing shunt loading of said first and second pairs of wires and for providing electrical impedance characteristics to said first and second pairs of wires representative of an open circuit, said isolation circuit further operable for combining said portions into said output voltage;

an amplifier coupled to said second connector and to said isolation circuit, said amplifier being powered by said output voltage from said telephone line when said telephone includes an electronic microphone handset;

an isolated rectifier circuit which powers said amplifier from said second connector when said telephone includes a handset other than an electronic microphone handset; and circuitry which automatically sets gain and impedance of said amplifier in response to detection of DC voltages at said second connector.

47. The telephone interface of claim 46, wherein said handset comprises a carbon microphone handset.

48. The telephone interface of claim 46, wherein said handset comprises a DC powered handset.

49. The telephone interface of claim 47 or 48 further comprising a voltage detector circuit.

50. The telephone interface of claim 49, wherein said voltage detector circuit enables lower transmit gain and higher transmit output impedance when connected to a telephone including an electronic microphone.

51. The telephone interface of claim 49, wherein said voltage detector circuit enables higher transmit gain and lower transmit output impedance when connected to a telephone including a carbon microphone.

52. The telephone interface of claim 46, wherein said amplifier comprises a balanced amplifier.

53. The telephone interface of claim 49, wherein said voltage detector circuit recognizes said DC powered handset and enables a current path for powering said amplifier from said second connector.

54. The telephone interface of claim 53, wherein said voltage detector circuit enables higher transmit gain and lower transmit output impedance when connected to a telephone including a DC powered handset.

55. The telephone interface of claim 46, wherein said telephone is powered by a DC voltage of one polarity provided on said first wire pair and the DC voltage of the opposite polarity on said second wire pair.

56. The telephone interface of claim 46, wherein said telephone is powered by loop current being present on either or both of said first and second pairs of wires.

57. The telephone interface of claim 8 further comprising a second voltage detector, wherein said second voltage detector operates to establish a current limited DC path between the ground terminal of said second connector and the ground node of said telephone interface.

58. The telephone interface of claim 17 further comprising a second voltage detector, wherein said second voltage detector operates to establish a current limited DC path between the ground terminal of said second connector and the ground node of said telephone interface.

59. The telephone interface of claim 26 further comprising a second voltage detector, wherein said second voltage detector operates to establish a current limited DC path between the ground terminal of said second connector and the ground node of said telephone interface.

60. The telephone interface of claim 35 further comprising a second voltage detector, wherein said second voltage detector operates to establish a current limited DC path between the ground terminal of said second connector and the ground node of said telephone interface.

61. The telephone interface of claim 44 further comprising a second voltage detector, wherein said second voltage detector operates to establish a current limited DC path between the ground terminal of said second connector and the ground node of said telephone interface.

62. The telephone interface of claim 53 further comprising a second voltage detector, wherein said second voltage detector operates to establish a current limited DC path between the ground terminal of said second connector and the ground node of said telephone interface.

* * * * *